United States Patent [19]
Park et al.

[11] Patent Number: 5,966,445
[45] Date of Patent: Oct. 12, 1999

[54] IDENTIFICATION SCHEME SINGLE OR MULTI-DIGITAL SIGNATURE SCHEME GIVING MESSAGE RECOVERY SINGLE OR MULTI-DIGITAL SIGNATURE SCHEME WITH APPENDIX KEY EXCHANGE SCHEME AND BLIND DIGITAL SIGNATURE SCHEME

[75] Inventors: Ill Hwan Park; Chung Ryong Jang, both of Seoul, Rep. of Korea

[73] Assignee: Korea Telecommunication Authority, Seoul, Rep. of Korea

[21] Appl. No.: 08/654,289

[22] Filed: May 28, 1996

[30] Foreign Application Priority Data

May 26, 1995 [KR] Rep. of Korea ............ 95-13388

[51] Int. Cl.$^6$ ................ H04K 1/00; H04L 9/00
[52] U.S. Cl. ................ 380/25; 380/30; 380/49
[58] Field of Search ................ 380/25, 30, 49

[56] References Cited

U.S. PATENT DOCUMENTS

| | | | |
|---|---|---|---|
| 5,140,634 | 8/1992 | Guillou et al. | 380/23 |
| 5,446,796 | 8/1995 | Ishiguro et al. | 380/24 |
| 5,600,725 | 2/1997 | Rueppel et al. | 380/30 |
| 5,633,929 | 5/1997 | Kaliski, Jr. | 380/23 |
| 5,668,878 | 9/1997 | Brands | 380/30 |
| 5,719,940 | 2/1998 | Ahn et al. | 380/25 |
| 5,761,305 | 6/1998 | Vanstone et al. | 380/21 |

*Primary Examiner*—Gail O. Hayes
*Assistant Examiner*—Hrayr A. Sayadian
*Attorney, Agent, or Firm*—Merchant & Gould P.C.

[57] ABSTRACT

An identification scheme which allows a prover to identify his own identity to a verifier more certainly and prevents already used authentication information from being re-used, a key exchange which uses a common secret key between two users in order not to allow an unauthorized to find it out, a digital signature scheme giving message recovery and digital signature scheme with appendix for producing a digital signature of a message recovery type or appendix type according to the size of a message to be signed, a multi-digital signature scheme for allowing multiple signers to generate digital signatures with respect to the same message and producing them in a message recovery type or appendix type according to the length of the message to be signed, and a blind digital signature scheme for producing a digital signature when a message to be signed should not be opened to the public as well as the signer and therefore a signer does not know the contents thereof.

8 Claims, 4 Drawing Sheets

IDENTIFICATION SCHEME SINGLE OR MULTI-DIGITAL SIGNATURE SCHEME GIVING MESSAGE RECOVERY SINGLE OR MULTI-DIGITAL SIGNATURE SCHEME WITH APPENDIX KEY EXCHANGE SCHEME AND BLIND DIGITAL SIGNATURE SCHEME

BACKGROUND OF THE INVENTION

The present invention relates to an identification scheme of a wide variety of applications based on security according to difficulty in solving discrete logarithm problems, single or multi-digital signature scheme giving message recovery, single or multi-digital signature scheme with appendix, key exchange, and blind digital signature scheme. Particularly, the present invention relates to an identification scheme which allows a prover to identify his own identity to a verifier more explicitly and prevents already used authentication information from being re-used, a key exchange scheme which uses a common secret key between two users in order not to allow an unauthorized to find it out, a digital signature scheme giving message recovery and digital signature scheme with appendix for producing a digital signature of a message recovery type or appendix type according to the size of a message to be signed, a multi-digital signature scheme for allowing multiple signers to generate digital signatures with respect to the same message and producing them in a message recovery type or appendix type according to the size of the message to be signed, and a blind digital signature scheme for producing a digital signature when a message to be signed should not be opened to the public and therefore a signer does not know the contents thereof.

During the development of science and semiconductor technology, computers have been widely spread and information exchange through computer networks has drastically increased. As a result, there is interest in protection of information such as identification of counterpart to exchange information with, the source of information exchanged, and its storage status, prior to exchange of information. As the current society has been entering the information society in which information would be recognized as goods, information to be transferred through public communication networks is becoming more important. Accordingly, damage is increasing due to illegal exposure or alteration of information.

Against these damages, there is increasing interest in protection of information circulated through communication lines such as public communication networks, and studies on protection of information are being briskly carried out.

For instance, there have been suggested identification schemes for allowing a communication counterpart or source of received data to be confirmed when information is exchanged through a variety of communication lines such as public communication networks, and digital signature schemes for enabling a signature of binary sequences coded by an originator on an electronic document in each of terminals prior to its communication processing, instead of hand-written signature on paper document. The digital signature schemes enable the source of transmitted document to be identified, as well as contents acknowledgement and whether the document is illegally altered or not.

In the identification schemes and digital signature schemes, assuming that p is a large prime number, q is another prime number for dividing p−1, g is a natural number having a remainder 1 obtained by dividing its $q^{th}$ power by p ($\equiv g^q$ mod p), g being between 1 and p, then g, q and p are system coefficients commonly utilized by users. If each user arbitrarily selects a numbers between 1 and q as a secret key and uses as a public key a remainder v ($\equiv g^{-s}$ mod p) obtained by dividing the $-s^{th}$ power of g by p, public coefficients used by the respective users are v, g, q and p.

It is hard to find out the secret key s from these public coefficients. Also, it is equivalent to the difficulty in calculating a solution of discrete logarithm. Numerous public key identification schemes and digital signature schemes are based on security from the fact that the discrete logarithms are difficult to calculate.

For such digital signature schemes, there may be classified into a digital signature scheme with appendix, a digital signature scheme giving message recovery, and a hybrid digital signature scheme using those methods in combination.

The digital signature scheme with appendix is a method in which a digital signature generated is attached to the end of a message to be signed. This signature is processed in pairs with the message signed. The digital signature scheme giving message recovery is to restore a message signed from a digital signature as a result of validity of the signature generated. A verifier confirms the contents of the restored message in order to verify the validity of the digital signature.

In the hybrid digital signature scheme using the appendix type and message recovery type in combination, a digital signature is generated for a message in the appendix type or message recovery type appropriately according to the length (binary bit streams) of the message signed or the purpose of the signature. For a short message, the hybrid digital signature scheme uses the message recovery method so that the data to verify the digital signature is reduced and in turn the amount of communication required is also reduced. For a long message, the appendix method is used while including information related to the message. As stated above, the hybrid digital signature scheme is characterized in adaptably generating a digital signature according to the length of a message signed.

Schnorr disclosed an identification scheme and digital signature scheme based on the security of discrete logarithm problem in 1989. The digital signature scheme suggested by Schnorr, which is a digital signature scheme with appendix, introduces a hash function to the digital signature scheme suggested by Elgamal in 1985, in order to simplify a procedure of generating and verifying digital signature. In addition, this scheme makes the generated digital signature smaller in size.

The identification scheme proposed by Schnorr uses the same algorithm structure as the digital signature scheme, and authenticates one's own identity to a communication counterpart. The identification scheme proposed by Schnorr in which a prover A authenticates his identity to a verifier B will be described now.

If the prover's system coefficients are g, q and p, the secret key is s (1<s<q), and the public key is v ($\equiv g^{-s}$ mod p), the prover A selects an arbitrary number r between 1 and q and transmits a remainder x ($\equiv g^r$ mod p) obtained by dividing the $r^{th}$ power of g by p to the verifier B. If x is received from the prover A, the verifier B selects an arbitrary number e between 1 and q and transmits the number e to the prover A. The prover A multiplies the secret key s by the arbitrary number e received from the verifier B and adds to this result the arbitrary number r used in the calculation of x. The prover A transmits a remainder y ($\equiv$r+se mod g) obtained by dividing r+se by q to the verifier B. If y is received from the prover A, the verifier B calculates a remainder x' ($\equiv g^Y v^e$ mod p) obtained by dividing by p the product of the $y^{th}$ power of g by the $e^{th}$ power of v. The verifier B authenticates the validity of prover's identity by confirming whether x' and x are equal to each other.

In the digital signature scheme with appendix proposed by Schnorr, if a message to be signed is m, a signer A selects an arbitrary number r between 1 and q and calculates a. remainder x ($\equiv g^r$ mod p) obtained by dividing the $r^{th}$ power of g by p. The message m and the calculated x are applied to the hash function to yield e (=h(x,m)). The signer A calculates a remainder y ($\equiv r+se$ mod q) obtained by dividing, by q, r added to the product of s by e. Then (e,y) is the digital signature with appendix for the message m. The validity of the digital signature (e,y) with appendix for the message m cane be easily verified and will be explained below.

That is, if the digital signature with appendix of the signer A for the message m is (e,y), the verifier B calculates a remainder x' ($\equiv g^Y v^e$ mod p) obtained by dividing by p the product of the $y^{th}$ power of g by the $e^{th}$ power of v which is the public key of signer A. The remainder x' and the message m are applied to the hash function to yield e' (=h(x',m). The validity of the digital signature (e,y) with appendix of the signer A is verified by confirming whether e' and e are the same.

Meanwhile, Nyberg and Rueppel proposed a digital signature scheme giving message recovery based on security of discrete logarithm problem in 1993. This digital signature scheme giving message recovery produces a digital signature for a message, and in addition, if the same system coefficients are used by both communication parties, is able to produce a session key as their secret key by using the same algorithm as the digital signature. The digital signature scheme giving message recovery of N-R (Nyberg-Rueppel) will now be described.

It is assumed that the signer's system coefficients are g, q and p, the secret key is s (1<s<q), the public key is v ($\equiv g^{-s}$ mod p), and the message to be signed is m. The signer selects an arbitrary number r between 1 and q, and calculates a remainder x ($\equiv mg^{-r}$ mod p) obtained by dividing by p the product of the message m by the $-r^{th}$ power of g. The signer adds r to the secrete key s multiplied by x to yield r+sx and calculates a remainder y ($\equiv r+sx$ mod q) obtained by dividing r+sx by q. Then (x,y) is the digital signature giving message recovery for the message m.

To verify the digital signature (x,y), the verifier calculates a remainder ($\equiv xg^Y v^x$ mod p) obtained by dividing by p the product of x by the $y^{th}$ power of g and by the $x^{th}$ power of v, to recover the message m. The verifier verifies the validity of the digital signature (x,y) by confirming the contents of the recovered message m.

Now, the key exchange will be described in which a session key is produced between users using the same algorithm as N-R digital signature scheme.

It is assumed that users A and B commonly use system coefficients g, q, and p, the user A's secret key is $s_A$, his public key is $v_A$ ($\equiv g^{-s_A}$ mod p), the user B's secret key is $s_B$, and his public key is $v_B$ ($\equiv g^{-s_B}$ mod p). When a session key is intended to be produced between users A and B, user A selects arbitrary numbers R and r between 1 and q, and calculates x($\equiv g^R g^{-r}$ mod p) and y($\equiv r+s_A$ mod q). The calcuation results (x,y) are sent to user B. User A calculates session key K ($\equiv (v_B)^R \equiv (g^{-s_B})^R$ mod p) obtained by dividing by p the $R^{th}$ power of user B's public key $v_B$ ($\equiv g^{-s_B}$ mod p).

User B calculates $g^R(\equiv xg^Y v_A^x$ mod p) from (x,y) received from user A, thereby restoring $g^R$, and calculates remainder K($\equiv (g^R)^{-s_B}$ mod p) obtained by dividing by p the $-s_B{}^{th}$ power of $g^R$. Therefore, users A and B can generate session key K between each other through one time transmission/reception.

For another key exchange based upon security of discrete logarithm problem, there was suggested Diffe-Hellman key exchange method for generating a session key between two users. In this method, given that two users A and B use g, q and p as system coefficients, the users A and B select arbitrary numbers a and b between 1 and q, respectively, and calculate $g^a$ and $g^b$. If they are exchanged, users A and B commonly have K($\equiv (g^a)^b \equiv (g^b)^a$ mod p).

In the conventional identification scheme, it is hard to obtain prover related information because identification is performed on basis of security of the identification scheme used, without prover's information such as identity, identification time, and user system, while the prover's identity is confirmed as proper. In the digital signature scheme message recovery, artificial redundancy is used to double the whole size of the signature and thus increase the load processed. In the appendix type, only the verification of signature is performed and obtaining signature related information is limited. In addition, the single signature scheme is hard to expand to the multi-signature schemes, the key exchanges or the blind digital signature scheme.

SUMMARY OF THE INVENTION

Therefore, in order to overcome such drawbacks of prior art, it is a first object of the present invention to provide an identification scheme in which a prover offers more information to a verifier, and already used identification information cannot be re-used.

Second and third objects of the present invention are to provide a method in which a digital signature is generated in the message recovery type or appendix type according to the length of a message to be signed, the length of binary streams.

It is a fourth object of the present invention to provide a key exchange in which two users use a common secret key so that they exchange it without allowing an unauthorized to know that.

Fifth and sixth objects of the present invention are to provide a multi-digital signature scheme giving message recovery or with appendix in which a digital signature is generated in the message recovery type or appendix type according to the size of a message to be signed, the length of binary streams, and multi-signers can generate their signatures for the same message.

A seventh object of the present invention is to provide a blind digital signature scheme in which a digital signature is generated even when the contents of a message signed is not open to the signer.

For the first object of the present invention, there is provided a method for authenticating a user's identity when system coefficients are g, q and p, comprising the steps of: (for a prover) selecting an arbitrary number r, obtaining $g^{-r}$, making out authentication information I including a prover's identity and a current time, transmitting a remainder x ($\equiv$ Ig$^{-r}$ mod p) obtained by dividing by p the product of the authentication information I by the $-r^{th}$ power of g to a verifier; (for the verifier) receiving x from the prover and transmitting an arbitrary number e to the prover; (for the prover) applying the remainder x and the arbitrary number e to a hash function to yield h(x,e), calculating a remainder y ($\equiv r+ah(x,e)$ mod q) obtained by dividing by q the arbitrary number r used in calculation of x and added to the product of h(x,e) by secret key a; and (for the verifier) receiving y, applying the remainder x and the arbitrary number e to the hash function to yield h(x,e), recovering the authentication information I contained in the remainder x by calculating a remainder $xg^Y v^{h(x,e)}$ mod p obtained by dividing, by p, the product of the remainder x by the $y^{th}$ power of g and by the $\{h(x,e)\}^{th}$ power of the prover's public key v, and authenticating the prover's identity by confirming the contents of the recovered authentication information I.

For the second object of the present invention, there is provided, in a method for generating a digital signature for a message m, when system coefficients are g, q and p, a digital signature scheme giving message recovery comprising the steps of: (for a signer) selecting an arbitrary number r, obtaining $g^{-r}$, and calculating a remainder x ($\equiv mg^{-r}$ mod p) obtained by dividing by p the product of $g^{-r}$ by message m; applying the remainder x and the signer identification ID to a hash function to yield h(x,ID), and calculating a remainder y ($\equiv r+ah(x,ID)$ mod q) obtained by dividing by q the arbitrary number r used in calculation of x and added to the product of h(x,ID) by secret key a to thereby generate a digital signature (x,y); and (for a verifier) applying the remainder x and the signer identification ID to the hash function to yield h (x,ID), recovering the message m contained in the remainder x by calculating a remainder $xg^y v^{h(x,ID)}$ mod p obtained by dividing, by p, the product of the remainder x by the $y^{th}$ power of g and by the $\{h(x,ID)\}^{th}$ with power of the signer's public key v, and verifying the validity of the digital signature for the message m by confirming the contents of the recovered message m.

For the third object of the present invention, there is provided, in a method for generating a digital signature for message m, when system coefficients are g, q and p, a digital signature scheme with appendix comprising the steps of: (1) (for a signer) applying the message m and identification ID to a hash function to obtain h(ID,m), selecting an arbitrary number r, obtaining $g^{-r}$, and calculating a remainder x ($\equiv h(ID,m)g^{-r}$ mod p) obtained by dividing by p the product of $g^{-r}$ by h(ID,m); (2) applying the remainder x and the message m to the hash function to yield h(x,m), and calculating a remainder y ($\equiv r+ah(x,m)$ mod q) obtained by dividing by q the arbitrary number r used in calculation of x and added to the product of h(x,m) by secret key a to thereby generate a digital signature (x,y); and (3) (for a verifier) applying the remainder x and the message in to the hash function to yield h(x,m), recovering a hash function value h(ID,m) of the message m contained in the remainder x by calculating a remainder $xg^Y v^{h(x,m)}$ mod p obtained by dividing, by p, the product of the remainder x by the $y^{th}$ power of g and by the $\{h(x,m)\}^{th}$ power of the signer's public key v; and (4) verifying the validity of the digital signature for the message m by confirming whether the hash function value of the message is equal to h(ID,m) obtained by applying the signer's ID and message m to the hash function.

For the fourth object of the present invention, there is provided, in case that two users A and B of prover and verifier generate a common secret key, a key exchanging method comprising the steps of: (for user A) generating arbitrary numbers R and r, obtaining the $R^{th}$ power of g, and calculating a remainder x ($\equiv g^R g^{-r}$ mod p) obtained by dividing by p the product of $g^R$ by the $-r^{th}$ power of g; (for user A) calculating a remainder k ($\equiv v_B^a \equiv g^{-ab}$ mod p) obtained by dividing the $a^{th}$ power of user B's public key $v_B$ by p, applying x and k to a hash function to obtain h(x,k), and calculating a remainder y ($\equiv r+ah(x,k)$ mod q) obtained by dividing by q arbitrary number r added to the product of h(x,k) by secret key a to transmit the result to user B; (for user A) calculating as a session key a remainder K ($\equiv v_B^R \equiv (g^{-b})^R$ mod p) obtained by dividing the $R^{th}$ power of user B's public key $v^B$ by p, and (for user B) calculating a remainder k ($\equiv v_A^b \equiv g^{-ab}$ mod p) obtained by dividing the $b^{th}$ power of user A's public key $v_A$ by p; and (for user B) from (x,y) received from user A, calculating a remainder $g^R \equiv xg^y v_A^{h(x,k)}$ mod p obtained by dividing by p the product of the $y^{th}$ power of g by the $h(x,k)^{th}$ power of user A's public key $v_A$ and by x, and (for user B) calculating a remainder K ($\equiv (g^R)^{-b}$ mod p) obtained by dividing the $-b^{th}$ power of $g^R$ by p to obtain a session key.

For the fifth object of the present invention, there is provided, in a digital signature scheme for multiple signers' generating a series of digital signatures for a message m, a multi-digital signature scheme giving message recovery comprising the steps of: (1) (for an initial signer of multiple signers) selecting an arbitrary number $r_1$ and calculating a, remainder $x_1$ ($\equiv mg^{-r_1}$ mod p) obtained by dividing by p the product of $g^{-r_1}$ by message m; (2) applying $x_1$ and signer's identification $ID_1$ to a hash function to obtain $h(x_1,ID_1)$, and calculating a remainder $y_1$ ($\equiv r_1+a_1 h(x_1,ID_1)$ mod q obtained by dividing by q arbitrary number $r_1$ added to the product of $h(x_1,ID_1)$ by secret key $a_1$ to thereby make a digital signature $(x_1,y_1)$ for message m; (3) (for ith signer ($i \geq 2$)) selecting an arbitrary number $r_i$ and calculating a remainder $x_i$ ($\equiv x_{i-1} g^{-r_i}$ mod p) obtained by dividing by p the product of $g^{-r_i}$ by $x_{i-1}$, applying $x_i$ and signer's identification $ID_i$, to a hash function to obtain $h(x_i,ID_i)$, and calculating a remainder $y_i$ ($\equiv r_i+a_i h(x_i,ID_i)$ mod q) obtained by dividing by q arbitrary number ri added to the product of $h(x_i,ID_i)$ by secret key ai to thereby make a digital signature $(x_i,y_i)$ for message m; and (4) confirming whether the multiple signers all generate their respective digital signatures, if there is any person who does not sign, returning to the step (3), and if not, generating a final digital signature $(y_1,y_2,y_3, \ldots y_{n-1},y_n, x_n)$; and (for a verifier) recovering the initial digital signature $(x_1,y_1)$ starting from $x_{n-1}$ recovered from $(x_n,y_n)$ using $x_i g^{y_i} V_i^{h(x_i,ID_i)}$ mod p, recovering message m from $(x_1,y_1)$ to verify the validity of digital signature.

For the sixth object of the present invention, there is provided, in a digital signature scheme for multiple signers' generating a series of digital signatures for a message m, a multi-digital signature scheme with appendix comprising the steps of: (1) (for an initial signer of multiple signers) applying message m and identification $ID_1$ to a hash function to obtain $h(ID_1,m)$, and making $I_1$ ($=h(ID_1,m)$, description phrase, current time) including $h(ID_1,m)$, description phrase for message m, current time; (2) selecting arbitrary number $r_1$, and calculating $x_1(\equiv I1 g^{-r_1}$ mod p) and $y_1$ ($\equiv r_1 + a_1 h(x_1,m)$ mod q) to thereby generate a digital signature $(x_1,y_1)$; (3) (for ith signer ($i \geq 2$)) receiving said digital signature $(x_i,y_i)$ and said message m, making $I_i$ ($=y_{i-1}$, description phrase, current time) including $y_1$, ith description phrase for message m, current time, selecting arbitrary number $r_i$, and calculating $x_i$ ($\equiv I_i g^{-r_i}$ mod p) and $y_i$ ($\equiv r_i + a_i h(x_i,m)$ mod g) to thereby generate an ith digital signature $(x_i,y_i$ ); (4) confirming whether the multiple signers all generate their respective digital signatures, if there is any person who does not sign, returning to the step (3), and if not, generating a final digital signature $(x_1, x_2, x_3, \ldots, x_{n-1}, x_n, y_n)$; and (for a verifier) recovering the initial digital signature $(x_1,y_1)$ starting from $y_{n-1}$ recovered from $(x_n,y_n)$ using $x_i g^{y_i} v_i^{h(x_i,m)}$ mod p, to verify the validity of digital signature confirm to verify whether $h(ID_1,m)$ of $I_1$ recovered from $(x_1,y_1)$ is equal to $h(ID_1,m)$ obtained by the verifier's computation.

For the seventh object of the present invention, there is provided, in a digital signature scheme for generating a digital signature for an electronic message m, when system coefficients are g, q, and p and a signer's public key is $v_A (\equiv g^{-a_A} \bmod p)$, a blind digital signature scheme comprising the steps of: (for a verifier) selecting an arbitrary number $r_B$, calculating a remainder $x_B$ ($\equiv m \, v_A^{r_B} \bmod p$) obtained by dividing by p the product of the $r_B{}^{th}$ power of the signer's public key $v_A$ ($\equiv g^{-a_A} \bmod p$) by message m, and transmitting $x_B$ to the signer; (for the signer) selecting an arbitrary number $r_A$, calculating a remainder $x_A$ ($\equiv m v_A^{r_B} g^{-r_A} \bmod p$) obtained by dividing by p the product of the $-r_A{}^{th}$ power of g by $x_B$ received, and transmitting $x_A$ to the verifier; (for the verifier) applying $x_A$ received from the signer and message m to the hash function to obtain $h(x_A, m)$, and calculating a remainder $y_B$ ($\equiv h(x_A,m)+r_B \bmod q$) obtained by dividing by q arbitrary number $r_B$ added to $h(x_A,m)$, and transmitting $y_B$ to the signer; (for the signer) calculating a remainder $y_A$ ($\equiv r_A + y_B a_A \bmod q$) obtained by dividing by q arbitrary number $r_A$ added to the product of received $y_B$ by secret key $a_A$ to thereby transmit $y_A$ to the verifier, and (for the verifier) receiving a blind signature $(x_A, y_A)$ for message m; and in order to verify the generated digital signature, (for the verifier) calculating a remainder $x_A g^{y_A} v_A^{h(x_A,m)} \bmod p$ obtained by dividing by p the product of the $h(x_A,m)^{th}$ power of $v_A$ by the $y_A{}^{th}$ power of g and by $x_A$, to thereby verify the validity of signer A's digital signature $(x_A, y_A)$ by recovering message m and confirming its contents.

For brief description, the present invention has a variety of applications based upon the security of the calculation difficulty of discrete logarithm problems. Particularly, the identification scheme enables a prover to provide more additional information to a verifier so that the prover is able to prove his own identity more certainly to the verifier.

That is, in order to allow the verifier to authenticate the prover's identity, the identification information includes his identification, current date and time, and information on a currently used system. As compared with other identification schemes, this method of the present invention offers more information to the verifier for a higher distingushable capability in authenticating the prover's identity.

The digital signature scheme of the present invention is a hybrid type in which a digital signature is generated in a message recovery type or appendix type according to the size (binary bit streams) of a message to be signed, the scheme being possibly used as a key exchange scheme. In case that a signature is generated in the message recovery type, the information recovered as a verification result of the digital signature includes the signer's description phrase for the message and date/time to sign so that the verifier can obtain the time to sign and the signer's additional information for the message.

In the multi-digital signature schemes of the present invention, several signers are able to generate a series of digital signatures for the same message or document on hierarchical business organization, and in the blind digital signature scheme of the present invention, the sicker generates a digital signature for a message without knowing its contents in case that a document is presented to a notarization office or registry for its notarization but should not be opened to the public.

BRIEF DESCRIPTION OF THE ATTACHED DRAWINGS

DETAILED DESCRIPTION OF PREFERRED EMBODIMENT

Hereinafter, preferred embodiments of the present invention will be described with reference to the attached drawings.

Figure 1:
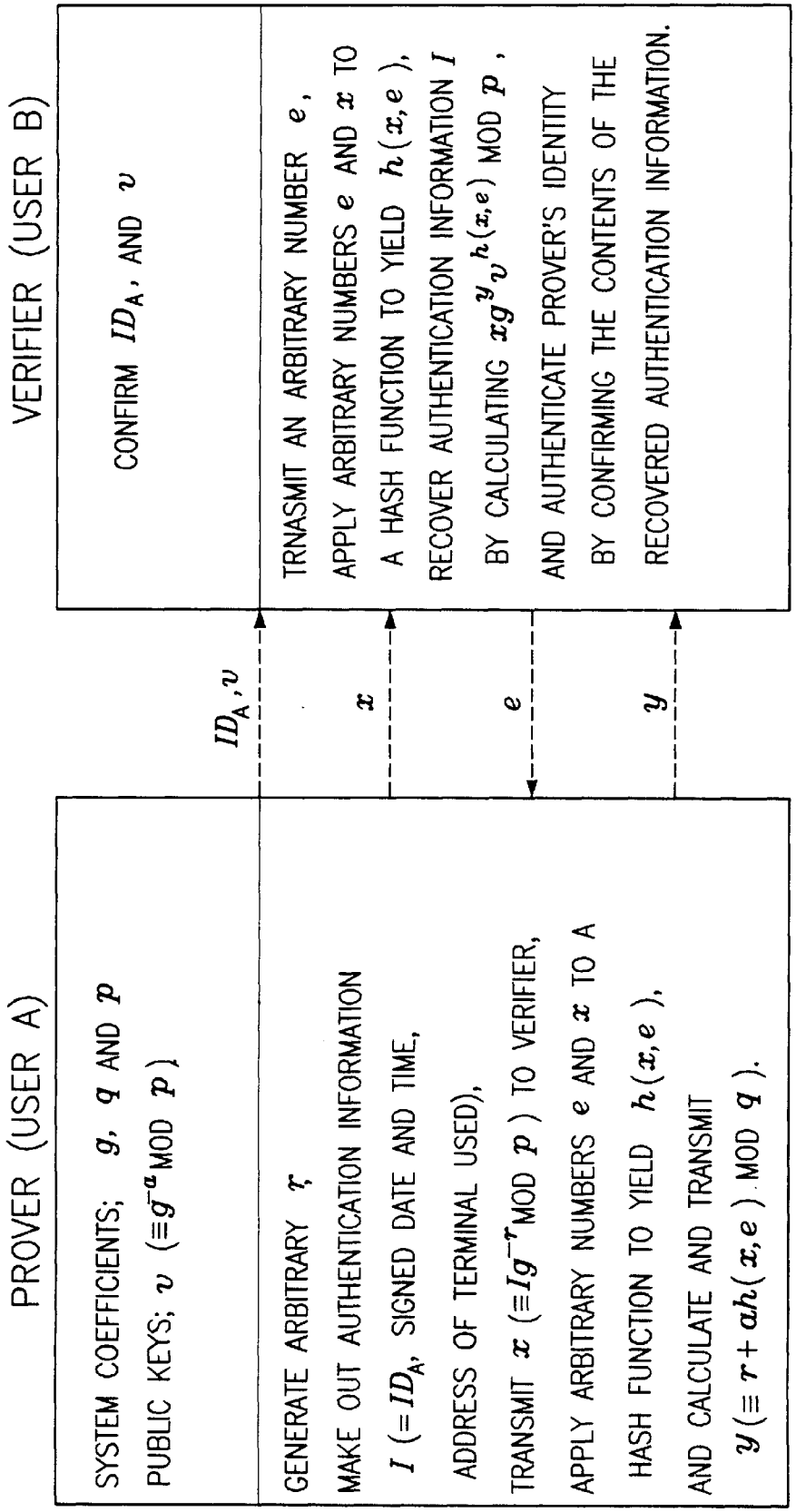
FIG. 1 shows tables illustrating an identification scheme in accordance with an embodiment of the present invention.

Referring to FIG. 1 showing an identification scheme of the present invention, it is assumed that g, q and p are system coefficients, p is a large prime number, q is another large prime number for dividing p−1, g is a natural number having a remainder 1 obtained by dividing its $q^{th}$ power by p ($\equiv g^q \bmod p$), g being between 1 and p. Each user arbitrarily selects a natural number a between 1 and q as a secret key, uses v ($\equiv g^{-a} \bmod p$) as a public key, and commonly uses h as a hash function. Each of the users receive an identification (ID) of a binary stream from a key authentication center in usage registration of the present invention.

As shown in the drawing, in the identification scheme of the present invention in which a prover A proves his identity to a verifier B, prover A selects an arbitrary number r between 1 and q and calculates the $-r^{th}$ power of g to obtain $g^{-r}$. The prover A makes out information I ($\equiv ID_A$, signed date and time, address of used terminal, etc.) including his identification $ID_A$, the signed date and time, a host computer address or a node address indicating the position of a terminal used and the like, and transmits x ($\equiv Ig^{-r} \bmod p$) obtained by dividing by p the product of I by $g^{-r}$, to the verifier B.

If x is received from the prover A, the verifier B selects an arbitrary number e between 1 and q and transmits the arbitrary number e to the prover A. The prover A applies e and x to the hash function to yield $h(x,e)$. The prover A transmits y ($\equiv r+ah(x,e) \bmod q$) obtained by dividing by q arbitrary number r used in calculation of x and added to the product of $h(x,e)$ by secret key a, to the verifier B.

If y is received from the prover A, x and e are input to the hash function to obtain $h(x,e)$, and the $y^{th}$ power of g is multiplied by the $h(x,e)^{th}$ power of A's public key v. The verifier B recovers the authentication information I by calculating $xg^y v^{h(x,e)} \bmod p$. The verifier B authenticates the prover's identity by confirming the contents of the recovered authentication information I.

If necessary, the prover substitutes 1 for identification information I included in x in order to calculate $x(\equiv g^{-r} \bmod p)$, calculates $y(\equiv r+ah(x,e) \bmod q)$ for e received from the verifier, and transmits the result to the prover. Here, for authentication of the prover's identity, the verifier may confirm whether I is 1, with $I \equiv xg^y v^{h(x,e)} \bmod p$.

Figure 2A:
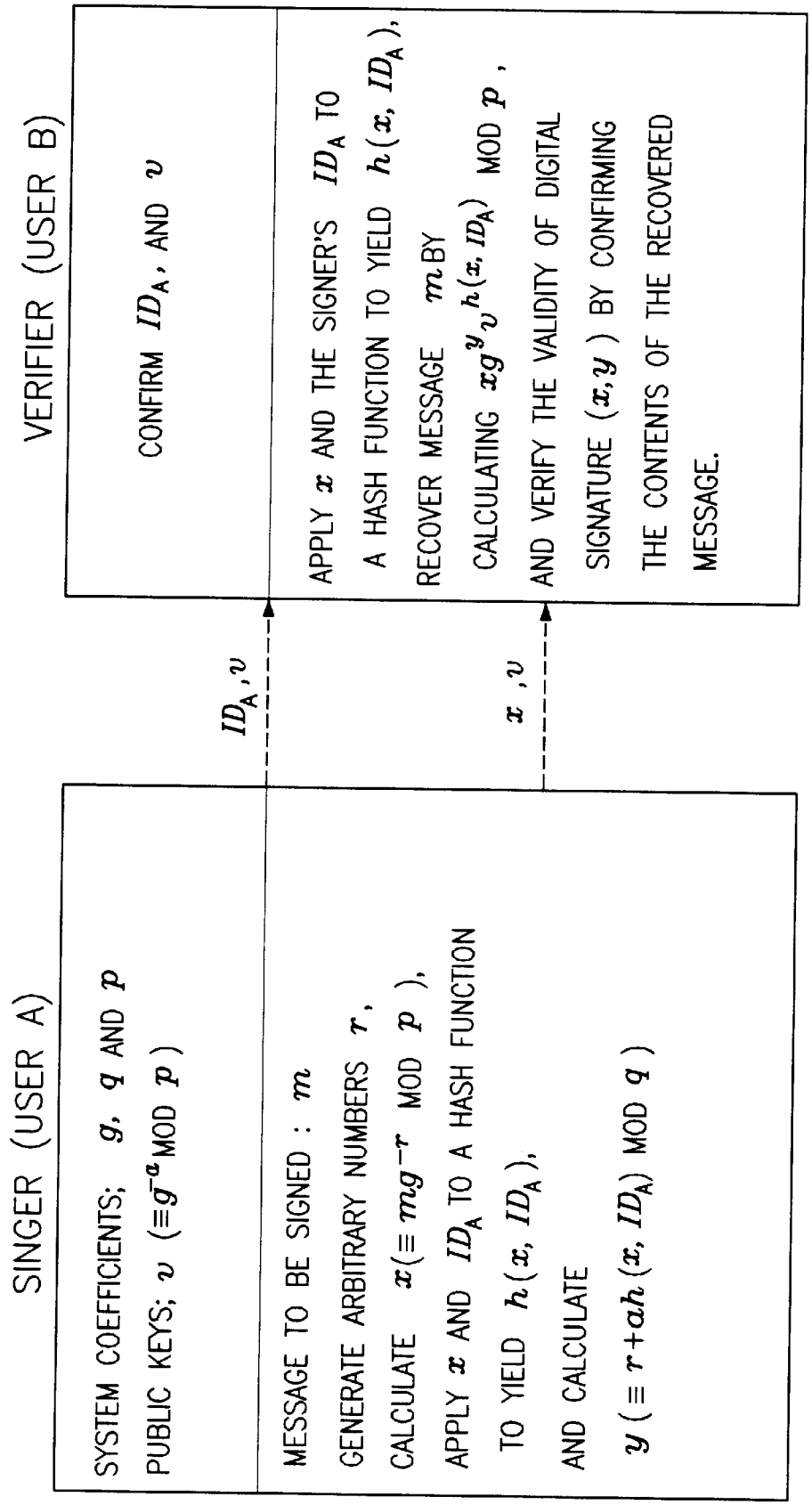
FIGS. 2A and 2B show tables illustrating digital signature schemes in accordance with other embodiments of the present invention.
Figure 2B:
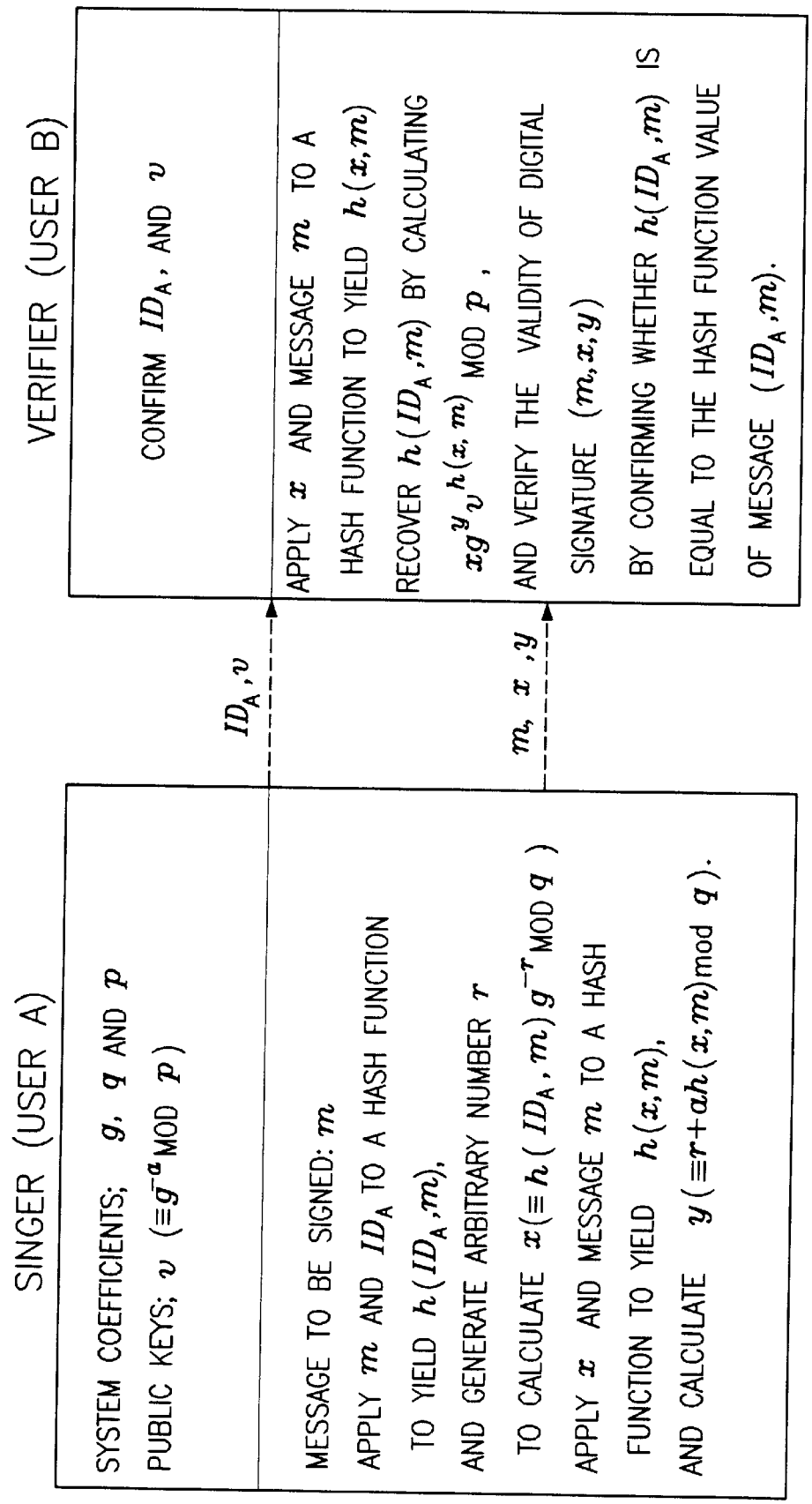

Turning to FIGS. 2A and 2B showing digital signature schemes, like the identification scheme, it is assumed that p is a large prime number, q is another large prime number for dividing p−1, g is a natural number having a remainder 1 obtained by dividing its $q^{th}$ power by p ($\equiv g^q \bmod p$), g being between 1 and p. The users commonly use g, q and p as system coefficients. Each user arbitrarily selects a natural number a between 1 and q as a secret key, and uses v ($\equiv g^{-a} \bmod p$) as a public key. Each of the users receives an identification(ID) of a binary stream from a key authentication center in usage registration of the present invention. The public coefficients of each user become g, q, p, v, and ID, and h is commonly used as a hash function. From now on, there will be described a mechanism of signer A's generating a digital signature for an electronic message m in a message recovery type or appendix type according to the size (the number of binary bits) of message m.

FIG. 2A shows a digital signature scheme giving message recovery according to the present invention, which is performed in case that the number of binary bits of message m to be signed is smaller than that of prime number p.

A signer A selects an arbitrary number r between 1 and q and calculates a remainder x ($\equiv mg^{-r}$ mod p) obtained by dividing by p the product of the message m by the $-r^{th}$ power of g. The signer A applies the remainder x and his identification $ID_A$ to the hash function to yield $h(x, ID_A)$, and obtains remainder y ($\equiv r + ah(x, ID_A)$ mod q). Then, (x,y) becomes a digital signature giving message recovery for message m. The validity of digital signature (x,y) for message m can be verified by anyone, identifying the contents of the recovered message with the result of verification. This verification method will be explained below.

To verify the signer A's digital signature (x,y) for message m, verifier B applies x and the signer's identification $ID_A$ to the hash function to yield $h(x, ID_A)$. The message m is recovered by calculating a remainder $xg^y v^{h(x, ID_A)}$ mod p obtained by dividing, by p, the product of x by the $y^{th}$ power of g and by the $\{h(x, ID_A)\}^{th}$ power of the public key v ($\equiv g^{-a}$ mod p). The verifier B verifies the validity of the signature for the message m by confirming the contents of the recovered message m.

FIG. 2B shows a process of a digital signature scheme with appendix according to the present invention, which is performed in case that the number of binary bits of message m to be signed is greater than that of prime number p.

The signer A applies his identification $ID_A$ and the message m to the hash function to yield I ($\equiv h(ID_A, m)$). The signer A selects an arbitrary number r between 1 and q, and calculates a remainder x ($\equiv Ig^{-r}$ mod p) obtained by dividing by p the product of I by the $-r^{th}$ power of g. The signer A applies x and the message m to the hash function to yield $h(x, m)$, and obtains y ($\equiv r + ah(x, m)$ mod q). Thus obtained (x,y) becomes the digital signature with appendix for message m, and is processed as (m,x,y) with the message.

To verify the signer A's digital signature m,x,y) with appendix for message m, the verifier B calculates $h(x,m)$ by applying x and the message m to the hash function. I is recovered by calculating a remainder $xg^y v^{h(x,m)}$ mod p obtained by dividing, by p, the product of x by the $y^{th}$ power of g and by $\{h(x,m)\}^{th}$ power of the signer's public key v. The verifier B applies the signer's identification $ID_A$ and the message m to the hash function to obtain $h(ID_A, m)$. The validity of the digital signature with appendix for the message m is verified by confirming whether the obtained $h(ID_A, m)$ is equal to the recovered I. The signer is able to generate a digital signature including information indicative of the signer's description phrase for the message and time to sign. That is, the signer applies his identification ID and the message m to the hash function to obtain $h(ID,m)$. The signer appends the description phrase for the message m to $h(ID, m)$. The signer makes out I ($\equiv h(ID_A, m)$, a description phrase, a time to sign) by appending the description for the corresponding message and the time when the digital signature is generated through a computational device, and generates the digital signature with appendix.

Unlike the conventional signature scheme in which signature is enabled only for message, this method includes various kinds of information for the message to be signed so that the verifier is able to confirm the validity of the signature and obtain message related information with the result of the signature verification.

Meanwhile, as the case may be, it is required that several signers generate digital signatures for the same message or business document. This is called multi-digital signature, which will be described below.

First of all, in a multi-digital signature scheme giving message recovery in which the size of a digital signature is reduced to decrease communication traffic. It is assumed that a message to be signed is m. In order for signers A, B and C to generate a series of digital signatures for message m with their identification $ID_A, ID_B$ and $ID_C$ respectively, signer A selects an arbitrary number $r_A$, and calculates a remainder $x_A$ ($\equiv mg^{-r_A}$ mod p) obtained by dividing by p the product of the $-r_A^{th}$ power of g by message m. $x_A$ and the first signer's identification $ID_A$ are input to the hash function to yield $h(x_A, ID_A)$, and a remainder $y_A$ ($\equiv r_A + a_A h(x_A, ID_A)$ mod q) is obtained by dividing by q arbitrary number $r_A$ added to the product of $h(x_A, ID_A)$ by secret key $a_A$. Through this procedure, $(x_A, y_A)$ becomes A's digital signature for message m.

Signer B selects an arbitrary number $r_B$, and calculates a remainder $x_B$ ($\equiv x_A g^{-r_B}$ mod p) obtained by dividing by p the product of the $-r_B^{th}$ power of g by message $x_A$. $x_B$ and the second signer's identification $ID_B$ are input to the hash function to yield $h(x_B, m)$, and a remainder $y_B$ ($\equiv r_B + a_B h(x_B, ID_B)$ mod q) is obtained by dividing by q arbitrary number $r_B$ added to the product of $h(x_B, ID_B)$ by secret key $a_B$. Through this procedure, $(x_B, y_B)$ becomes B's digital signature for message m.

Signer C selects an arbitrary number $r_C$, and calculates a remainder $x_C$ ($\equiv x_B g^{-r_C}$ mod p) obtained by dividing by p the product of the $-r_C^{th}$ power of g by message $x_B$. $x_C$ and the third identification $ID_C$ are input to the hash function to yield $h(x_C, ID_C)$, and a remainder $y_C$ ($\equiv r_C + a_C h(x_C, ID_C)$ mod q) is obtained by dividing by q arbitrary number $r_C$ added to the product of $h(x_C, ID_C)$ by secret key $a_C$. Through this procedure, $(x_C, y_C)$ becomes C's digital signature for message m. Therefore, the multi digital signature is generated as $(y_A, y_B, y_C, x_C)$.

In the verification of these digital signatures, $x_B$ is recovered from C's digital signature $(x_C, y_C)$ for message m using $x_C g^{y_C} v_C^{h(x_C, ID_C)}$ mod p, $x_A$ is recovered from B's digital signature $(x_B, y_B)$ for message m using $x_B g^{y_B} v_C^{h(x_B, ID_B)}$ mod p, and message m is recovered from A's digital signature $(x_A, y_A)$ using $x_A g^{y_A} v_A^{h(x_A, ID_A)}$ mod p. By confirming its contents and verifying the validity of A's digital signature, the validity of the recovered message m digital signatures $y_A, y_B, y_C$, and $x_C$ can be verified.

According to this procedure, n signers can generate multiple signatures $y_1, y_2, y_3, \ldots, y_{n-1}, y_n, x_n$ for message m. The initial signer's digital signature $(x_1, y_1)$ is recovered starting from $x_{n-1}$ recovered from $(x_n, y_n)$ using $x_i g^{y_i} v_i^{h(x_i, ID_i)}$ mod p. From the initial signature, message m is recovered from $(x_1, y_1)$ and confirmed to verify the validity of the whole multiple signatures.

In the multi-digital signature scheme with appendix in which description phrases and time to sign for the respective signers are included in a message, signer A applies message m and $ID_A$ to the hash function to obtain $h(ID_A, m)$, and makes out $I_A$ ($\equiv h(ID_A, m)$ description phrase and current time) including the description phrase of A for message m and current time. Then, arbitrary number $r_A$ is selected and $x_A (\equiv I_A g^{-r_A}$ mod p) and $y_A (\equiv r_A + a_A h(x_A, m)$ mod q) are calculated to generate digital signature $(x_A, y_A)$. Signer B makes out $I_B$ (=$y_A$, description phrase and current time) including $y_A$, the description phrase of B for message m and current time. Then, arbitrary number $r_B$ is selected and $x_B$(=$I_B g^{-r_B}$ mod p) and $y_B$,(=$r_B + a_B h(x_B,m)$ mod q) are calculated to generate digital signature ($x_B,y_B$). Signer C makes out $I_C$ (=$y_B$, description phrase and current time) including $y_B$, the description phrase of C for message m and current time. Then, arbitrary number $r_C$ is selected and $x_C$(=$I_C g^{-r_C}$ mod p) and $y_C$(=$r_C + a_C h(x_C,m)$ mod q) are calculated to generate digital signature ($x_C,y_C$). $x_A$, $x_B$, $x_C$, and $y_C$ become multiple digital signatures with appendix for message m.

For the verification of these digital signatures, the verifier recovers $y_B$ from signature ($x_C,y_C$) using $x_C g^{y_C} v_C^{h(x_C,m)}$ mod p, and $y_A$ from signature ($x_B,y_B$) using $x_B g^{y_B} v_B^{h(x_B,m)}$ mod p so that the validity of digital signature ($x_A,y_A$) is verified using $x_A g^{y_A} v_B^{h(x_A, m)}$ mod p and confirmed to verify whether $h(ID_A,m)$ of $I_A$ recovered from ($x_A,y_A$) is equal to $h(ID_A,m)$ obtained by the verifiers's computation. In the respective steps, the verifier is allowed to know the signer's description phrase for the message and time to generate the digital signature.

According to this procedure, n signers can generate multiple signatures $x_1$, $x_2$, $x_3$, ..., $x_{n-1}$, $x_n$, $y_n$. The initial signer's digital signature ($x_1,y_1$) is recovered starting from $y_{n-1}$ recovered from ($x_n,y_n$) using $x_n g^{y_n} v_n^{h(x_n,m)}$ mod p. The initial signature is confirmed to verify the validity of the whole multiple signatures whether $h(ID_A,m)$ of $I_A$ recovered from ($x_1,y_1$) is equal to $h(ID_A,m)$ obtained by the verifier's computation.

Figure 3:
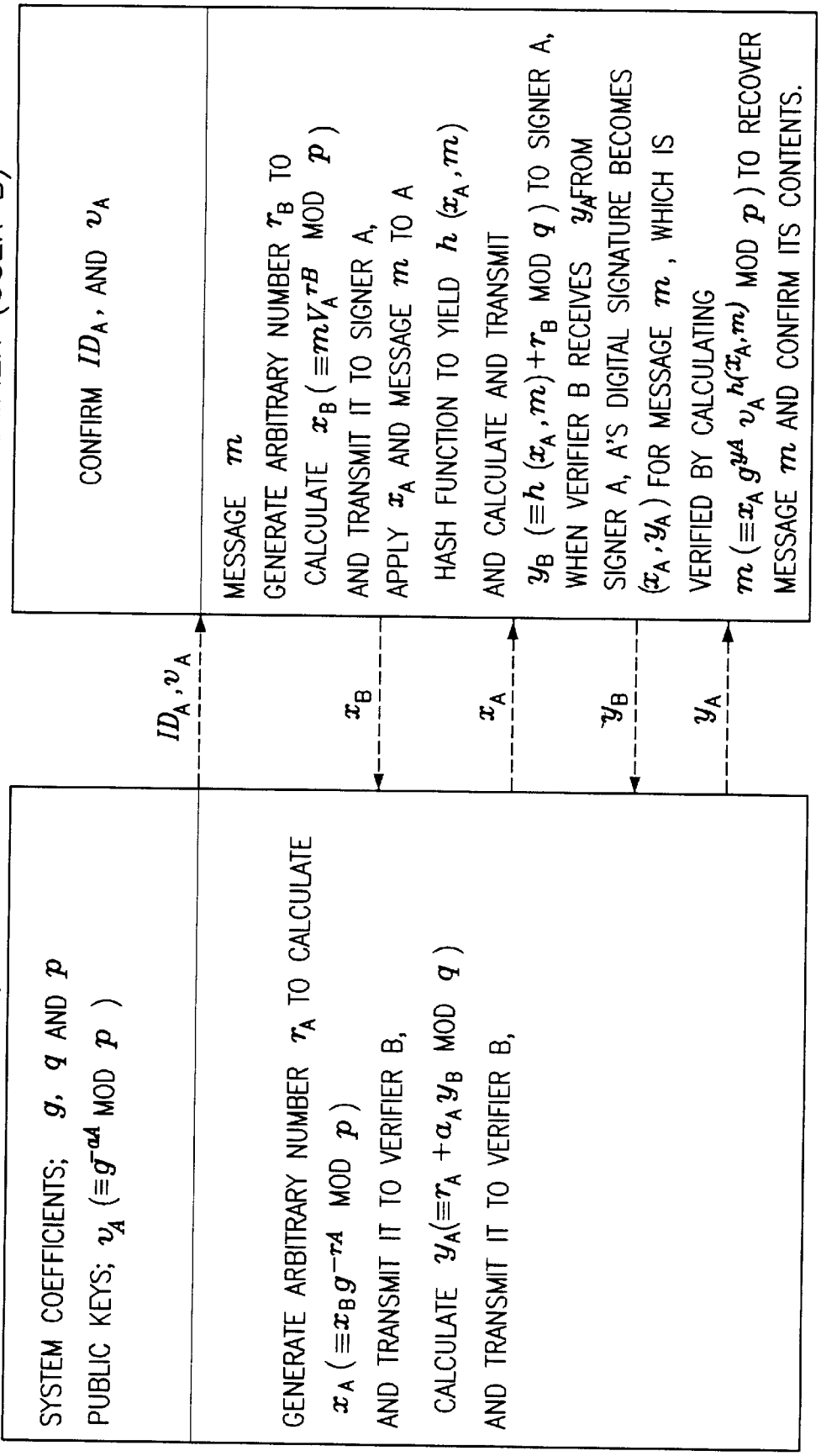
FIG. 3 shows tables illustrating the generation of a blind signature in accordance with another embodiment of the present invention.

FIG. 3 shows a flowchart of generating a blind signature of the present invention, which is designed to make a digital signature for a message while a signer does not know its contents. This is mostly used when a document is presented to a notarization office or registry for notarization but its contents should not be opened to the public. In order for a signer A to generate a digital signature while the contents of a message m is not open to signer A, verifier B selects an arbitrary number $r_B$ and calculates the $r_B^{th}$ power of A's public key $v_A$(=$g^{-a_A}$ mod p). Remainder $x_B$ (=$mv_A^{r_B}$ mod p) is obtained by dividing by p the product of $v_A^{r_B}$ by message m, and then transmitted to signer A.

Signer A selects an arbitrary $r_A$ and calculates remainder $x_A$ (=$mv_A^{r_B} g^{-r_A}$ mod p) obtained by dividing by p the product of the $-r_A^{th}$ power of g by $x_B$, and then transmitted to signer A. Then, verifier B applies $x_A$ received from signer A and message m to the hash function to obtain $h(x_A,m)$. Remainder $y_B$(=$h(x_A,m) + r_B$ mod q) is obtained by dividing arbitrary number $r_B$ added to $h(x_A,m)$ by q, and then transmitted to signer A.

Signer A calculates remainder $y_A$(=$r_A + y_B a_A$ mod q) obtained by dividing by q, $y_B$ received from verifier B, multiplied by secret key $a_A$ and added by arbitrary number $r_A$, and sends the result to verifier B, verifier B receives blind signature ($x_A,y_A$) for message m from signer A. The signature ($x_A,y_A$) is verified by B calculating $m$(=$x_A g^{y_A} v^{h(x_A,m)}$ mod p) in order to recover message m and confirm its contents.

In the key exchange, if two users A and B use system coefficients g, q and p, and hash function h, user A's secret key is a, his public key is $v_A$(=$g^{-a}$ mod p), user B's secret key is b, and his public key is $v_B$(=$g^{-b}$ mod p), a method of generating a common secret key of users A and B will be explained below.

User A generates arbitrary numbers R and r and calculates a remainder $x$(=$g^R g^{-r}$ mod p) obtained by dividing by p the product of the $R^{th}$ power of g by the $-r^{th}$ power of g. Then, user A calculates a remainder k (=$v_B^a$=$g^{-ab}$ mod p) obtained by dividing the $a^{th}$ power of user B's public key $v_B$ by p, and applies x and k to the hash function to yield h (x,h) . Then, user A calculates a remainder y (=$r + ah(x,k)$ mod q) obtained by dividing by q arbitrary number r added to the product of h(x,h) by secret key a, and calculates as a session key a remainder K (=$v_B^R$=$(g^{-b})^R$ mod p) obtained by dividing the Rth power of user B's public key $v_B$ by p.

User B calculates k (=$v_A^b$=$g^{-ab}$ mod p) obtained by dividing the $b^{th}$ power of user A's public key $v_A$ by p, and then calculates remainder $g^R$=$xg^y v_A^{h(x,k)}$ mod p obtained by dividing by p the product of the $y^{th}$ power of g by the $h(x,k)^{th}$ power of user A's public key $v_A$ and by x. Then, user B calculates as a session key a remainder K (=$(g^R)^{-b}$ mod p) obtained by dividing the $-b^{th}$ power of user B's public key $g^R$ by p.

Through this procedure, users A and B commonly have K as their secret key. In the key exchange of the present invention, a third party cannot calculate K from users A and B's public keys $v_A$ and $v_B$ because $g^R$ cannot be recovered from information (x,y) transmitted to user B from user A.

As described above, in the identification scheme of the present invention, because the current time is included in identification information, any prover cannot use previously used x to a verifier, and an unauthorized cannot use previously calculated (x,y). This invention is hard to commit perjury to because an unauthorized cannot calculate I with respect to x and arbitrary number e selected by the verifier within a time sufficient to recover a proper user's ID and current time. In addition, this invention uses a common secret key between two users, enhancing the reliability of the system.

In the multi-digital signature schemes of the present invention, several signers are able to generate a series of digital signatures for the same message or document on hierarchical business organization.

In the blind digital signature scheme of the present invention, the contents of a message is not open to the signer A and verifier B cannot find out the secret key of signer A so that verifier B is unable to commit forgery to the digital signature of signer A for message m.

What is claimed is:

1. A computer implemented method for authenticating a user's identity when system coefficients are g, q and p, comprising the steps of:

for a prover, selecting an arbitrary number r, obtaining $g^{-r}$, making out authentication information I including a prover's identity and a current time, transmitting a remainder x (=$Ig^{-r}$ mod p) obtained by dividing by p the product of said authentication information I by the $-r^{th}$ power of g to a verifier;

for said verifier, receiving x from said prover and transmitting an arbitrary number e to said prover;

for said prover, applying said remainder x and said arbitrary number e to a hash function to yield h(x,e), calculating a remainder y (=$r + ah(x,e)$ mod q) obtained by dividing by q said arbitrary number r used in calculation of x and added to the product of h(x,e) by secret key a; and for said verifier, receiving y, applying said remainder x and said arbitrary number e to said hash function to yield h(x,e), recovering said authentication information I contained in said remainder x by calculating a remainder $xg^y v^{h(x, e)}$ mod p obtained by dividing, by p, the product of said remainder x by the $y^{th}$ power of g and by the $\{h(x, e)\}^{th}$ power of said prover's public key v, and authenticating said prover's identity by confirming the contents of the recovered authentication information I.

2. A computer implemented method for generating and verifying a digital signature for a message m, when system coefficients are g, q and p, a digital signature scheme giving message recovery comprising the steps of:

for a signer selecting an arbitrary number r, obtaining $g^{-r}$, and calculating a remainder x ($\equiv mg^{-r}$ mod p) obtained by dividing by p the product of $g^{-r}$ by message m;

applying said remainder x and said signer identification ID to a hash function to yield h(x,ID), and calculating a remainder y ($\equiv r+ah(x,ID)$ mod q) obtained by dividing by q said arbitrary number r used in calculation of x and added to the product of h(x,ID) by secret key a to thereby generate a digital signature (x, y); and for a verifier, receiving said digital signature (x, y) and said identificaiton ID, applying said remainder x and said signer identification ID to said hash function to yield h(x,ID), recovering said message m contained in said remainder x by calculating a remainder $xg^y v^{h(x,ID)}$ mod p obtained by dividing, by p, the product of said remainder x by the $y^{th}$ power of g and by the $\{h(x,ID)\}^{th}$ power of said signer's public key v, and verifying the validity of said digital signature for said message m by confirming the contents of the recovered message m.

3. A computer implemented method for generating and verifying a digital signature for message m, when system coefficients are g, q and p, a digital signature scheme comprising the steps of:

(1) for a signer, applying said message in and identification ID to a hash function to obtain h (ID,m), selecting an arbitrary number r, obtaining $g^{-r}$, and calculating a remainder x ($\equiv h(ID,m)g^{-r}$ mod p) obtained by dividing by p the product of $g^{-r}$ by h(ID,m);

(2) applying said remainder x and said message in to the hash function to yield h(x,in), and calculating a remainder y ($\equiv r+ah(x,m)$ mod q) obtained by dividing by q said arbitrary number r used in calculation of x and added to the product of h(x,m) by secret key a to thereby generate a digital signature (x,y); and (3) for a verifier, receiving said digital signature (x,y) and said message in, applying said remainder x and said message m to said hash function to yield h(x,m), recovering a hash function value h(ID,m) of said message in contained in said remainder x by calculating a remainder $xg^y v^{h(x,m)}$ mod p obtained by dividing, by p, the product of said remainder x by the $y^{th}$ power of g and by the $\{h(x,m)\}^{th}$ power of said signer's public key v; and (4) verifying the validity of said digital signature for said message m by confirming whether said hash function value of said message is equal to h(ID,m) obtained by applying the signer's ID and message m to the hash function.

4. A computer implemented method, with a digital signature scheme, as claimed in claim 3, wherein said step (1) further comprises a substeps of obtaining I (=h(ID,m), description phrase, time to sign) including h(ID,m), the description phrase for message m and time to sign, and calculating a remainder x obtained by dividing by p the product of I by $g^{-r}$.

5. A computer implemented method for key exchange when two users A and B of prover and verifier generate a common session key with their public keys $v_A(\equiv g^{-a}$ mod p) and $v_B(\equiv g^{-b}$ mod p) respectively, comprising the steps of:

for user A, generating arbitrary numbers R and r, obtaining the $R^{th}$ power of g, and calculating a remainder x ($\equiv g^R g^{-r}$ mod p) obtained by dividing by p the product of $g^R$ by the $-r^{th}$ power of g;

for user A, calculating a remainder k ($\equiv v_B{}^a \equiv g^{-ab}$ mod p) obtained by dividing the $a^{th}$ power of user B's public key $v_B$ by p, applying x and k to a hash function to obtain h(x,k), and calculating a remainder y ($\equiv r+ah(x,k)$ mod q) obtained by dividing by q arbitrary number r added to the product of h(x,k) by secret key a to transmit the result to user B;

for user A, calculating as a session key a remainder K ($\equiv v_B{}^R \equiv (g^{-b})^R$ mod p) obtained by dividing the $R^{th}$ power of user B's public key $v_B$ by p, and (for user B) calculating a remainder k ($\equiv v_A{}^b \equiv g^{-ab}$ mod p) obtained by dividing the $b^{th}$ power of user A's public key $v_A$ by p; and for user B, from (x,y) received from user A, calculating a remainder $g^R (\equiv xg^y v_A{}^{h(x,k)}$ mod p) obtained by dividing by p the product of the $y^{th}$ power of g by the $h(x,k)^{th}$ power of user A's public key $v_A$ and by x, and for user B calculating a remainder K ($\equiv (g^R)^{-b}$ mod p)) obtained by dividing the $-b^{th}$ power of $g^R$ by p to obtain a session key.

6. A computer implemented method for generating and verifying digital signature when multiple signers' generating a series of digital signatures for a message m, a multi-digital signature scheme giving message recovery comprising the steps of;

(1) for an initial signer of multiple signers, selecting an arbitrary number $r_1$ and calculating a remainder $x_1 (\equiv mg^{-r_1}$ mod p) obtained by dividing by p the product of $g^{-r_1}$ by message m;

(2) applying $x_1$ and the first signer's identification $ID_1$ to a hash function to obtain $h(x_1,ID_1)$, and calculating a remainder $y_1$ ($\equiv r_1 + a_1{}^{h(x1,ID_1)}$ mod q) obtained by dividing by q arbitrary number $r_1$ added to the product of $h(x_1,ID_1)$ by secret key $a_1$ to thereby make a digital signature $(x_1,y_1)$ for message m;

(3) for ith signer, wherein i≧2, receiving said message m and said $(x_{i-1}, y_{i-1})$, selecting an arbitrary number $r_i$ and calculating a remainder $x_i$ ($\equiv x_{i-1} g^{-r_i}$ mod p) obtained by dividing by p the product of $g^{-r_i}$ by $x_{i-1}$, applying $x_i$ and $ID_i$ to a hash function to obtain $h(x_i, ID_i)$, and calculating a remainder $y_i$ ($\equiv r_i + a_i h(x_i,ID_i)$ mod q) obtained by dividing by q arbitrary number $r_i$ added to the product of $h(x_i,ID_i)$ by secret key $a_i$ to thereby make a digital signature $(x_i,y_i)$ for message m, and send said digital signature $(x_i,y_i)$ to the next signer; and (4) confirming whether the multiple signers all generate their respective digital signatures, if there is any person who does not sign, returning to the step (3), and if not, generating a final digital signature $(y_1, y_2, y_3, \ldots, y_{n-1}, y_n, x_n)$; and for a verifier receiving said multi digital signature $(y_1, y_2, \ldots, y_{n-1}, y_n, x_n)$ and the signer's identifications $ID_i$ recovering the initial digital signature $(x_1,y_1)$ starting from $x_{n-1}$ recovered from $(x_n,y_n)$ using $x_i g^{y_i} v_i{}^{h(x_i,ID_i)}$ mod p, recovering message m from $(x_1,y_1)$, to verify the validity of digital signature.

7. A computer implemented method for generating and verifying signature when multiple signers' generating a series of digital signatures for a message m, a multi-digital signature scheme with appendix comprising the steps of:

(1) (for an initial signer of multiple signers, applying message m and identification $ID_1$ to a hash function to obtain $h(ID_1,m)$, and making $I_1(=h(ID_1, m)$, description phrase, current time) including $h(ID_1,m)$, description phrase for message m, current time;

(2) selecting arbitrary number $r_1$, and calculating $x_1$ ($=I_1 g^{-r_1}$ mod p) and $y_1$ ($=r_1+a_1 h(x_1, m)$ mod q) to thereby bgenerate a digital signature $(x_1,y_1)$;

(3) for ith signer, wherein, $i \geq 2$ receiving said digital signature $(x_i,y_i)$ and said message m, making $I_i$ ($=y_{i-1}$, description phrase, current time) including $y_{i-1}$, ith description phrase for message m, current time, selecting arbitrary number $r_i$, and calculating $x_i$ ($=I_i g^{-ri}$ mod p) and $y_i$ ($=r_i+a_i(x_i, m)$ mod q) to thereby generate an ith digital signature $(x_i,y_i)$;

(4) confirming whether the multiple signers all generate their respective digital signatures, if there is any person who does not sign, returning to the step (3), and if not, generating a final digital signature $(x_1, x_2, x_3, \ldots, x_{n-1}, x_n, y_n)$; and for a verifier receving said multi digital signature $(x_1, x_2, x_3, \ldots, x_{n-1}, x_n, y_n)$, said message m and the first signer's identification $ID_1$, recovering the initial digital signature $(x_1, y_1)$ starting from $y_{n-1}$ recovered from $(x_n,y_n)$ $x_i g^{y_i} v_i^{h(x_i, m)}$ mod p, to verify the validity of the multi digital signature confirming to verify whether hash(ID,m) of $I_1$ recovered from $(x_1,y_1)$ is equal to $h(ID_1, m)$ obtained by the verifier's computation.

8. A computer implemented method for generating and verifying digital signature for an electronic message m, when system coefficients are g, q, and p and a signer's public key is $v_A (=g^{-a_A}$ mod p), a blind digital signature scheme comprising the steps of:

for a verifiers, selecting an arbitrary number $r_B$, calculating a remainder $x_B$ ($=mv_A^{r_B}$ mod p) obtained by dividing by p the product of the $r_B^{th}$ power of the signer's public key $v_A$ ($=g^{-aA}$ mod p) by message m, and transmitting $x_B$ to the signer;

for the signer, selecting an arbitrary number $r_A$, calculating a remainder $x_A$ ($=mv_A^{r_B}g^{-r_A}$ mod p) obtained by dividing by p the product of the $-r_A^{th}$ power of g by $x_B$ received, and transmitting $x_A$ to the verifier;

for said verifier, applying $x_A$ received from said signer and message m to the hash function to obtain $h(x_A, m)$, and calculating a remainder $y_B$ ($=h(x_A, m) +r_B$ mod q) obtained by dividing by q arbitrary number $r_B$ added to $h(x_A, m)$, and transmitting $y_B$ to the signer;

for said signer, calculating a remainder $y_A$ ($=r_A+y_B a_A$ mod q) obtained by dividing by q arbitrary number $r_A$ added to the product of received $y_B$ by secret key $a_A$ to thereby transmit $y_A$ to the verifier, and for said verifier, receiving a blind signature $(x_A,y_A)$ for message m; and in order to verify the generated digital signature, for said verifiers, calculating a remainder $x_A g^{y_A} v_A^{h(x_A, m)}$ mod p obtained by dividing by p the product of the $h(x_A, m)^{th}$ power of $v_A$ by the $y_A^{th}$ power of g and by $x_A$, to thereby verify the validity of signer A's digital signature $(x_A, y_A)$ by recovering message m and confirming its contents.

\* \* \* \* \*